R. J. Steele, Jr.,
Riding Saddle.
N° 77,849.  Patented May 12, 1868.

Witnesses.
W. C. Aslekettle
J. Fraser

Inventor.
R. Steele Jr
per Munn & Co.
Attorneys.

United States Patent Office.

ROBERT J. STEELE, JR., OF ROCKINGHAM, NORTH CAROLINA.

Letters Patent No. 77,849, dated May 12, 1868.

IMPROVEMENT IN SPRING-SEAT FOR SADDLES.

The Schedule referred to in these Letters Patent and making part of the same.

TO ALL WHOM IT MAY CONCERN:

Be it known that I, ROBERT J. STEELE, Jr., of Rockingham, in the county of Richmond, and State of North Carolina, have invented a new and improved Spring-Seat for Saddles; and I do hereby declare that the following is a full, clear, and exact description thereof, which will enable others skilled in the art to make and use the same, reference being had to the accompanying drawings, forming part of this specification.

Similar letters of reference indicate corresponding parts.

My invention has for its object to furnish an improved spring-seat for saddles, which shall be so constructed and arranged as to be easy and comfortable to the rider, however rough may be the horse's gait, rendering horseback-riding more pleasant, in every respect, than buggy or sulky-riding; and it consists in the combination of the springs and seat with the frame or tree of the saddle, the whole being constructed and arranged as hereinafter more fully described.

Figure 1:
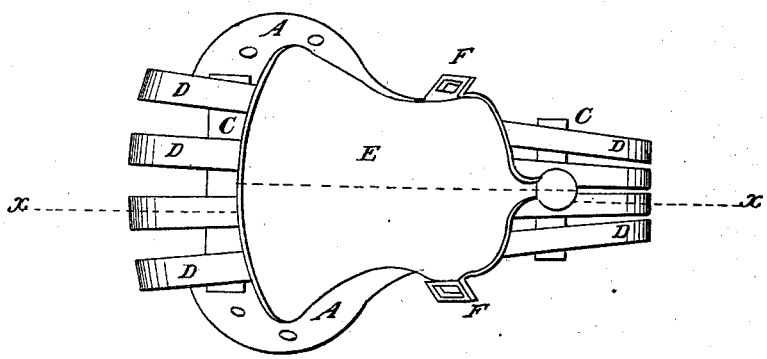
Figure 1 is a top view of the skeleton of a saddle illustrating my invention.
Figure 2:
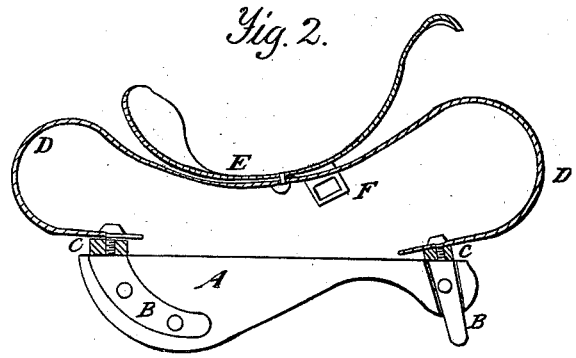
Figure 2 is a detail sectional view of the same, taken through the line $x\,x$, fig. 1.

A are the wooden side parts of the saddle-tree or frame, which rest upon the horse's back, and which should be padded and covered in the usual manner. The side parts A are connected at their forward and rear ends by curved bars B, having a horizontal bar, C, formed upon or attached to the upper or middle part of said curved bars. D are springs, the rear ends of which are riveted or otherwise securely attached to the rear horizontal bar C. The springs D are curved into the general form shown in fig. 2, and their forward ends are riveted or otherwise securely attached to the front horizontal bar C. E is the seat, which is riveted or otherwise securely attached to the middle or downwardly-curved part of the springs D, as shown in fig. 2. F are the loops or staples, to which the stirrup-straps are attached, and which are formed upon or attached to the seat E. The seat E may be made of wood or metal, should be padded, and covered with leather or cloth in the usual manner, the saddle-skirts being attached to and depending from said covering. The springs D should be covered with cloth or leather, entirely concealing them from view.

I claim as new, and desire to secure by Letters Patent—

1. The bent springs D, forming the support for the curved seat E, each spring being secured at its ends to the horizontal cross-bars C C, at the front and rear end of the frame A, as herein described for the purpose specified.

2. Forming the support for the curved seat E of single springs, whose front and rear curved ends are secured to horizontal cross-bars at the front and rear of the frame A, as herein described for the purpose specified.

The above specification of my invention signed by me, this 15th day of January, 1868.

ROBERT J. STEELE, JR.

Witnesses:
W. W. Y. FOWLKES,
FRANK SANDFORD.